Feb. 20, 1951  E. H. LORENZ  2,542,090
GAUGING MACHINE
Filed April 27, 1946  4 Sheets-Sheet 2

INVENTOR
EDWARD H. LORENZ
BY Parham † Bates
ATTORNEYS

Feb. 20, 1951 E. H. LORENZ 2,542,090
GAUGING MACHINE
Filed April 27, 1946 4 Sheets-Sheet 3

INVENTOR
EDWARD H. LORENZ
BY Parham + Bates
ATTORNEYS

Feb. 20, 1951        E. H. LORENZ        2,542,090
GAUGING MACHINE Filed April 27, 1946        4 Sheets-Sheet 4

*INVENTOR*
*EDWARD H. LORENZ*
BY *Parham + Bates*
*ATTORNEYS*

Patented Feb. 20, 1951

2,542,090

UNITED STATES PATENT OFFICE 2,542,090

GAUGING MACHINE

Edward H. Lorenz, West Hartford, Conn., assignor to Hartford-Empire Company, Hartford, Conn., a corporation of Delaware Application April 27, 1946, Serial No. 665,599

7 Claims. (Cl. 209—88)

This invention relates to machines for gauging circular articles or circular portions thereof, such as the rim or finish portions of jars or other glass articles, and for automatically discarding the gauged articles which are too large or too small in diameter or are objectionably out of round or irregularly surfaced.

Articles, such as glass jars, must have finish or sealing surfaces coming within prescribed limits as to size, shape and contour in order to be suitable to be satisfactorily sealed by the use of appropriate sealing caps or closures. If the diameter of the finish portion or sealing surface of such an article is too large or too small or is out of round or includes bulging or sunk-in portions or abrupt vertical shoulders or seams, it is unsatisfactory for the intended use and should be discarded.

The present invention provides a novel and efficient machine which will automatically handle a continuous line of jars or similar articles, gauge each of such articles, automatically reject and discard each gauged article that is defective, and deliver the satisfactory articles to a conveyor or other appropriate article-receiving means.

An object of the invention is to provide a gauging machine of the character described which is relatively simple in construction but is fully automatic and will handle and gauge glass jars or similar articles accurately and with requisite rapidity to permit the operation of the machine to be coordinated with the operations of associate glassware handling and/or packing machinery.

Generally described, the machine of the invention may comprise an intermittently rotated turret which has a series of article-receiving pockets in its periphery, each of which is presented in its turn at each of a plurality of successive stations. At one of these stations, an article loading mechanism automatically loads an article to be gauged into each pocket that is presented at that station. At a subsequent station, the article in the pocket there is rotated about its own axis in contact with cooperative finish or sealing surface gauging rollers, one of which is movable relative to the others. If the article gauged at that station is defective, as determined by a movement of the movable gauging roller, the gauging mechanism acts to pre-set a normally inactive article-ejecting mechanism so that the latter will function to eject the defective article from its pocket when that pocket arrives at a subsequent discard station. At a still later station, each article that has passed the inspection or test is ejected from its pocket by automatically acting unloading mechanism so as to be delivered to a conveyor or other article-receiving means.

The operating parts of the machine are driven in coordination with one another and with associate article-conveying means so that a series or line of glass jars or the like may be by-passed from an incoming conveyor through the machine, by which each such article is gauged in its turn and discarded if defective, the satisfactory articles being returned to an outgoing conveyor so that they may be transported in a single file to a filler or other associate machine or for any other useful purpose.

Other objects and advantages of the invention will become apparent from or will be pointed out in the following specification which is directed particularly to an illustrative embodiment of the invention, as shown in the accompanying drawings, in which.

Figure 3:
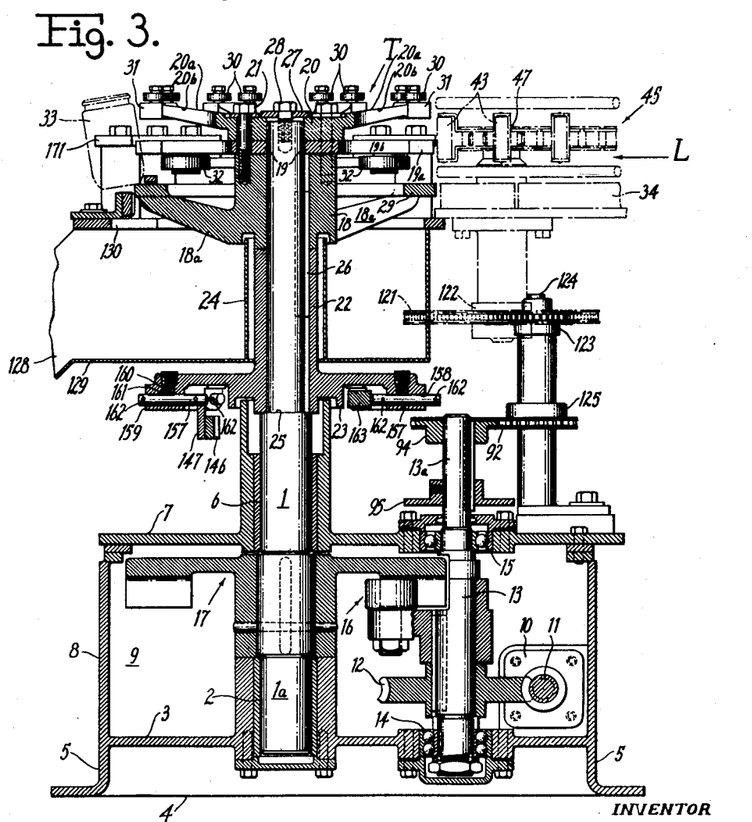
Fig. 3 is a vertical section through the machine, along line 3—3 of Fig. 1, with parts omitted, showing the driving means for the turret and, in dot-and-dash lines, part of the loading mechanism, which actually is in the foreground.

Referring now to the drawings, a turret, generally designated T, Figs. 1, 2, 3 and 5 is mounted on the upper end of a vertically disposed main shaft 1, Fig. 3. The shaft 1 has a relatively reduced lower end portion 1a, journaled in a bearing 2 on a supporting base plate 3 as shown in Fig. 3. The base plate may be supported above the level of a floor 4 or the like, as by a downturned supporting flange 5, or by any other suitable supporting means. The main shaft 1 may extend through and an intermediate portion thereof may be journaled in a tubular bearing structure 6 which may be carried by a horizontal plate 7 that is mounted on an upright continuous wall 8 on the base plate 3. This box-like structural arrangement provides an enclosure 9 in which are located elements of a driving mechanism for rotating the shaft 1 and the turret thereon intermittently and for transmitting motion to other driven parts of the machine, as hereinafter will be explained.

As shown in Fig. 3, the driving mechanism of the machine comprises a suitable source of rotary motion, such as a motor and reduction gear unit or the like, shown more or less diagrammatically at 10 as being mounted on the side wall 8 of the enclosure 9 and as being provided with a worm shaft 11. The latter is in mesh with a worm wheel 12 keyed to a short vertical shaft 13, the lower end portion of which is rotatably supported in an anti-friction bearing 14 in a portion of the supporting base member 3. The shaft 13 is further rotatably supported by an anti-friction bearing assembly 15 in a portion of the enclosure top plate 7 through which such shaft extends and above which the upper end portion 13a thereof projects. A Geneva drive mechanism within the enclosure comprises an actuator 16 keyed to the shaft 13 to rotate therewith and an actuated member 17 fastened to the main shaft 1 in cooperative relation to the actuator so that each complete revolution of the latter will cause a predetermined partial rotation of the shaft 1. This will be such as to move each peripheral pocket of the turret on the shaft 1 angularly a distance equal to the distance between adjacent pockets.

The turret T, in the example shown, comprises a lower spider 18, an intermediate spider 19 and an upper spider 20. These are fastened together, as by the cap bolts 21, Figs. 1, 2 and 3. The hub of the lower spider is shown, Fig. 3, as resting upon the hub 22 of a rotary carrier 23 for a plurality of angularly spaced, radially movable actuator pins. A tubular guard 24 encircles parts of these hubs. The carrier 23 also is mounted on the main shaft 1, its hub resting upon an upwardly facing shoulder 25 on that shaft. The assembly of spiders and the carrier 23 are fastened to the shaft 1 to rotate therewith, as by the key 26, Fig. 3. A retaining disk 27 may be fastened to the upper end of the shaft 1 by a cap bolt 28 so as to prevent accidental or unintended upward displacement of the turret from the shaft 1.

The upper spider 20, in the example shown, comprises eight radially projecting arms 20a and a like number of re-entrant portions or recesses 20b which alternate with the projecting arms. The intermediate spider 19 similarly has alternating projecting arms 19a and re-entrant portions or recesses 19b. The respective recesses 19b are located directly beneath and in vertical alignment with the re-entrant portions or recesses 20b in the upper spider. The lower spider, 18, includes an annular, flat rim strip 29 on its radial arms 18a. Portions, designated 29a, Figs. 1 and 2 of this rim strip 29, underlie the vertically aligned re-entrant portions or recesses 19b and 20b of the intermediate and upper spiders, respectively, and constitute partial bottoms for the turret pockets P, the side walls of which are defined by the walls of the re-entrant or recessed portions of the intermediate and upper spiders.

Article positioning rollers 30 are mounted on the outer end portions 31 of the arms 20a of the upper spider so that the peripheries of a pair of those rollers project into the upper part of each pocket P from opposite sides thereof. The outer end portions 31 of the upper spider arms 20b may be outwardly flaring to restrict the width of the upper part of the entrance to each pocket P to a width but slightly, if any, greater than the distance between the projecting peripheries of the rollers 30 in the upper part of that pocket.

Further positioning rollers 32 are mounted on the arms 19a of the intermediate spider 19 so as to project laterally into each of the pockets P from opposite sides thereof at places radially inward from the upper positioning rollers 30. The rollers 32 are larger, in the example shown, than the upper positioning rollers 30 and are adapted to contact with the body of an article, such as a glass jar 33, in the pocket when the upper rollers 30 are in contact with the finish or rim portion of that article. The relative positions of the upper and lower positioning rollers in the examples shown are such that the larger, lower rollers 32 contact with the body of the article 33 rearwardly of the vertical center line of the article, that is, toward the axis of rotation of the turret, while the smaller, upper rollers contact with the finish or rim portion of the article at more forwardly located places. These may be at diametrically opposite points on such finish or rim portion of the article. When in a pocket P, the article 33 stands upon the portion 29a of the lower spider rim that constitutes a partial bottom for that pocket.

Figures 1, 2:
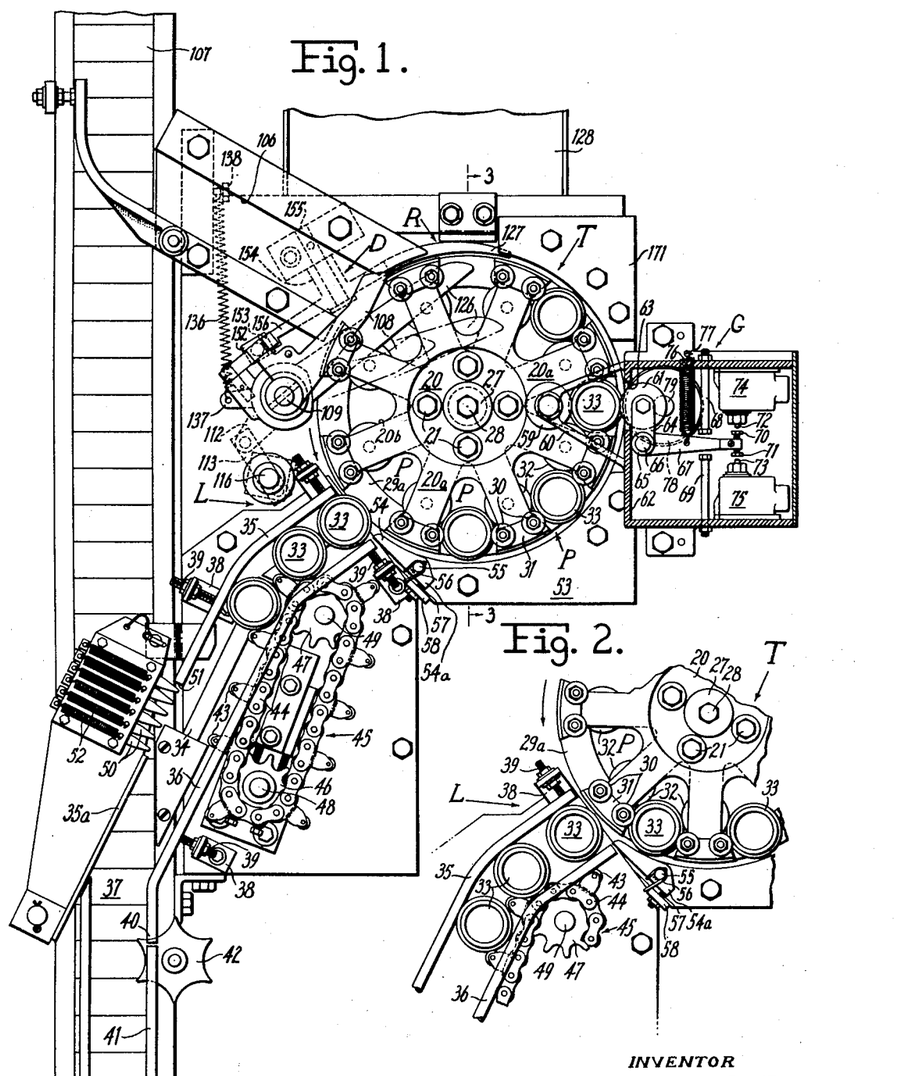
Fig. 1 is a plan view of such embodiment, with the housing of the gauging mechanism thereof shown in section, and with some parts of a complete machine omitted.
Fig. 2 is a fragmentary plan view of cooperative parts of the machine turret and the associate loading mechanism and adjacent structure, showing how articles are spaced by the loading mechanism so that the leading article at the loading station is not forced against the periphery of the turret while said turret is rotating.

Each rotary movement of the turret T brings a pocket P to an article loading station at which a loading mechanism, generally designated L, Figs. 1, 2 and 3, is provided. During a dwell of the turret, an article 33 is introduced into the pocket P at the loading station.

The loading mechanism comprises a guide-way comprising a bottom member 34 on which the articles 33 may slide and a pair of spaced guide-rails 35 and 36, respectively, between which the articles are slid from a horizontally disposed moving conveyor 37 to the entrance of a turret pocket P when the pocket is at the loading station. The rails 35 and 36 are fastened to supporting brackets 38 by adjusting devices 39 so that the width of the article guide-way can be adjusted within limits to accommodate articles of different diameters. The guide-rail 36 is joined in any suitable way at 40 to the adjacent guide-rail 41 of the conveying mechanism which includes the conveyor 37. The other guide rail of the loading mechanism, that is, the guide rail 35, includes a section, indicated at 35a, extending diagonally across the conveyor 37 so as to deflect articles from the latter into the loading mechanism.

A star wheel 42 is mounted at the side of the conveyor opposite to the rail 35a and in advance of the juncture of the conveyor and loading mechanism. This star wheel projects into the path of the articles brought by the conveyor 37 to the loading mechanism and is turned idly in engagement with each such article.

The articles entering the guide-way of the loading mechanism are impelled positively along such guide-way by projecting pusher elements 43 which are provided at regularly spaced intervals on links 44 of an endless horizontal chain 45 which is mounted for movement around the horizontally spaced sprocket wheels 46 and 47, respectively. These sprocket wheels are mounted on vertical shafts 48 and 49, respectively, the shaft 49 being driven to coordinate the movements of the pusher elements 43 with the intermittent rotary movements of the turret T, as hereinafter will be explained. The chain 45 has one of its longitudinal stretches located adjacent to the guide-rail 36 of the loading mechanism so that the pusher elements 43 on that stretch project into the guide-way so as to contact the articles therein and to propel them along that guide-way toward the loading station. The pusher elements which, in the example shown, are vertically disposed rollers, also will space the articles as they propel them along the guide-way. The pusher element nearest to the turret will move out of contact with the article 33 that is being pushed thereby as such pusher element moves around the sprocket 47. As shown in Fig. 1, the article 33 engaged by this pusher on the portion of the chain passing around the sprocket 47 is being pushed against the preceding article 33 so that the latter is being impelled into the waiting pocket P of the turret. The particular article that is being pushed by the pusher element moving around the sprocket 47 will have an accelerated movement at this time in relation to the rate of movement of articles by other pusher elements on the relatively straight stretch of the chain 45 between the sprockets. The effect of this accelerated movement of the end pusher element is to increase the space between each article 33 moved to the loading station and the next article so that, as shown by Fig. 2, the particular article waiting at the loading station for the next pocket P of the turret to arrive will be free from pressure from the oncoming article and hence will not be forced against the periphery of the rotating turret. Each article at the loading station is subjected to pressure from behind only when the open entrance of a pocket of the turret is in position to receive that article.

To prevent jamming of the articles 33 in the loading mechanism, especially at the place at which successive articles are first engaged by pusher elements 43, a series of yieldable guiding fingers 50 may be mounted at the side of the loader guide-way opposite the chain 45 in the gap 51 in the guide rail 35—35a. If a jam of the articles should form in the space between the first pusher member 43 and the opposite side of the loader guide-way, one or more of the yieldable guide elements 50 will yield under pressure from such articles against the resistance of the springs 52 to efficiently break up the jam by allowing the jammed articles to resume a single file order in the loader guide-way.

Each article 33 entering a pocket P of the loading station will be pushed into such pocket against the article-body-contacting rollers 32 and the article-finish or rim-portion-contacting rollers 30, to which reference hereinbefore has been made. As the turret is rotated in a counter-clockwise direction as viewed in Fig. 1 the articles 33 in the loaded pockets are retained against accidental outward displacement from such pockets by a retaining or guard member 53. An end section, designated 54, of this retaining or guard member is mounted pivotally at 55 so as to be urged by a torsion spring 56 to an operative position adjacent to the periphery of the turret at the loading station. The particular position thereof relative to the turret may be determined by the contact of the tail piece 54a of the pivoted section 54 with an adjustable stop screw 57 on a stationary bracket 58. The pivoted section 54 will exert a yielding pressure against the body of an article 33 to guide such article gently into contact with the fixed rail 53 as the turret moves it away from the loading station.

The intermittent rotation of the turret T in a counter-clockwise direction as viewed in Fig. 1 will bring each article 33 in a pocket P in its turn to a gauging station at which a gauging mechanism, generally designated G is provided. This gauging mechanism comprises an inner gauging roller 59, pivotally suspended from a supporting bracket 60 that overhangs the turret at the gauging station, and an outer movably mounted, diametrically opposite gauging roller 61. The gauging roller 59 is disposed in a relatively fixed position so as to contact the finish or rim portion of the article 33 at the gauging station at the side of the latter nearest to the axis of rotation of the turret while the movable gauging roller 61 contacts the same finish or rim portion of such article at its opposite side. These places of contact of the gauging rollers with the rim or finish portion of the article being gauged may be intermediate the places of contact of the upper positioning rollers 30 with the same finish or rim portion.

The bracket 60 may be carried by a portion of a box-like housing structure 62 which may be located at the gauging station and may house the movable elements of the gauging mechanism. As shown, Fig. 1, this housing 62 has an opening 63 in its wall next to the turret through which the periphery of the movable gauging roller 61 may protrude for contact with the article at the gauging station.

The roller 61 is pivotally suspended from one end of an arm 64 of a bell crank lever 65 which is fulcrumed on a vertical pivot element 66 located within the housing 62. The bell crank lever 65 has another arm, indicated at 67, which extends horizontally in the housing 62 between a pair of opposed stop members 68 and 69, respectively. These are mounted on the side walls of housing 62 so that the gap between them may be adjusted within limits. The free end portion of the bell crank lever arm 67 carries a pair of oppositely extending adjustable lateral contacts 70 and 71, respectively, which are adapted to cooperate with the projecting stems 72 and 73, respectively, of electrical gauge limit switches 74 and 75, respectively. These gauge limit switches may be microswitches which are located in relatively fixed positions at opposite sides of the arm 67 and each will remain open unless and until its projecting stem is engaged and pushed inwardly by the cooperative contact 70 or 71. A spring 76 connects the arm 67 with a fixed anchorage, as a pin 77 located at the side of housing 62 at which the switch 74 is located. The spring 76 is under sufficient tension to hold the arm 67 against the stop 68 when no article is at the gauging station. The gauging roller 61 then will be at the limit of its outward or projected position toward the cooperative gauging roller 59 and the contact 70 will be pressed against the stem 72 of the switch 74. These are the inactive positions of these parts of the gauging mechanism while the turret is rotating and before the roller 61 has been moved outward or away from the roller 59 more or less by its contact with the rim or finish portion of an article in gauging position. Because of the cooperative action of control means, hereinafter described, this closing of the switch 74 during inactivity of the gauging mechanism and rotary motion of the turret will not close an operating circuit, also hereinafter described, which will be closed by a like closing of the switch 74 when the turret is stationary and an article is being gauged by the gauging rollers.

Figure 4:
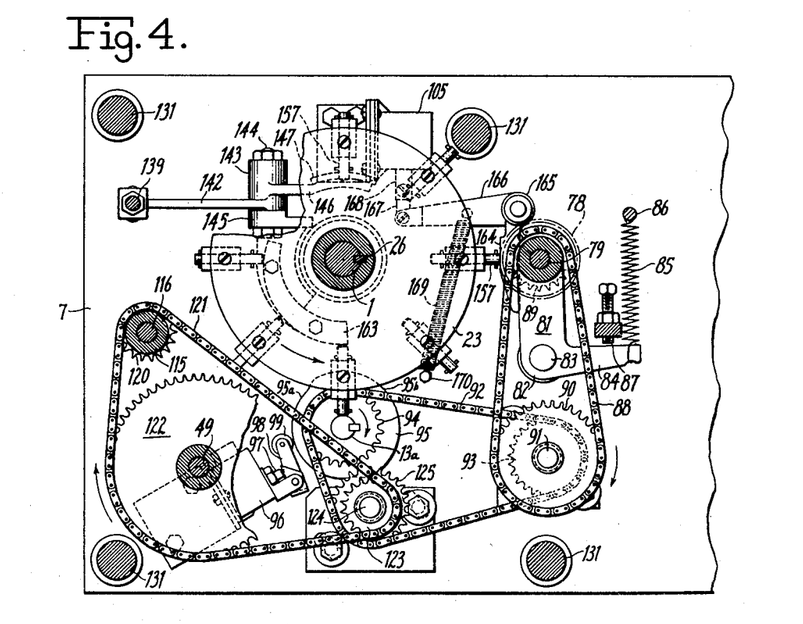
Fig. 4 is a horizontal section through the machine at approximately the line 4—4 of Fig. 5, with parts omitted and other parts broken away.
Figure 5:
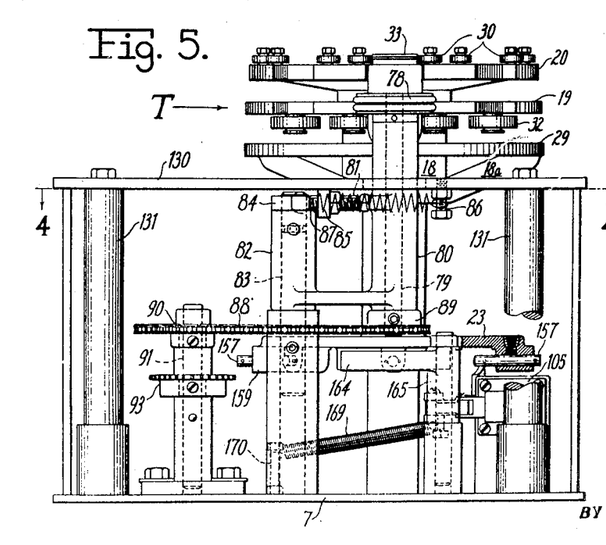
Fig. 5 is a view, mainly in elevation, of the upper part of the machine, showing a friction roller for rotating each article at the gauging station together with means for supporting and driving such roller.

The gauging mechanism also includes an article spinning friction roller 78, Figs. 1, 4 and 5, mounted on a vertical shaft 79 which is journaled in a bearing 80 on an arm 81 of a bell crank lever 82. The latter is mounted on a vertical pivot shaft 83. The bell crank lever 82 has another arm, 84, connected by a tension coil spring 85 with a fixed anchoring element, as the pin 86, Fig. 4, whereby the spring tends to pull the lever arm 84 against an adjustable stop 87 and thereby to maintain the friction article-spinning roller 78 in position to contact at its periphery with the body of an article 33 at the gauging station. See Fig. 1. The periphery of the roller 78 may be covered with rubber or leather or other suitable material to afford the desired friction between it and the article 33 without scratching the latter.

A chain 88, Fig. 4, connects a sprocket 89 on the friction roller shaft 79 with a sprocket 90 on an intermediate shaft 91. The latter is driven by a chain 92 which passes around a sprocket 93 on the shaft 91 and also around a sprocket 94 on the upper end portion 13a of the hereinbefore mentioned continuously rotating shaft 13. See Figs. 3 and 5. The structural arrangement is such that the article 33 at the gauging station is turned around its axis by the rotating friction roller 78 while the cooperative gauging rollers 59 and 61 are gauging the finish or rim portion of that article. If the diameter of the finish or rim portion of the article comes within prescribed limits, the contacts 70 and 71 for closing the switches 74 and 75, respectively, will remain in their inactive positions, out of contact with the stems of their switches. However, should the diameter of the gauged portion of the article be less than is permissible, the consequent swing of the contact 70 toward the switch 74 will close the latter. When this takes place during a dwell of the turret at the gauging station, mechanism hereinafter to be described will be set to effect ejection of the article from the turret at a subsequent station. The same result will be accomplished if the diameter of the gauged portion of the article is too large and because of this the switch 75 is closed. Likewise, if the gauged portion of the article has a bulging portion or a sunken portion or a vertical seam or shoulder or some kindred irregularity in its surface, the consequent movement of the movable gauging roller 61 and the closing of one or the other of the switches 74 or 75 will set the same mechanism to cause ejection of the defective article at the subsequent station.

The hereinbefore mentioned upper portion 13a of the continuously rotating shaft 13 carries a cam 95, Figs. 3 and 4, for controlling the operation of a micro-switch 96, Fig. 4. This switch, 96, includes a projecting stem 97 which may be pressed inwardly to open the switch by a pivoted arm 98 carrying a roller 99 which rides on the periphery of the cam 95. The arrangement is such that during the part of each complete cycle of rotation of the shaft 13—13a that is required for movement of the turret between stations, the roller 99 rides on a relatively high portion 95b of the cam. During the remainder of the cycle or rotation of the shaft 13, 13a when the turret is stationary and an article 33 in a pocket P thereof is at the gauging station, the roller 99 will ride on a relatively low portion 95a of the cam and the micro-switch 96 will be closed.

Figure 7:
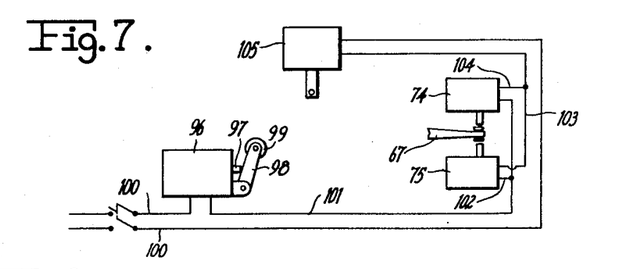
Fig. 7 is a diagram of the principal electrical mechanisms of the machine and connections therefor.

As shown in the diagrammatic view, Fig. 7, the switch 96, is operatively connected with one of a pair of leads 100 and also is connected by a wire 101 with the gauge limit switch 74 and by a branch wire 102 with the gauge limit switch 75. The switches 74 and 75 are connected electrically by wires 103 and 104 with one side of a solenoid 105 with which the second lead wire 100 is connected. This solenoid has a function hereinafter to be explained. It will be apparent at this time that when the switch 96 is closed, closing of either switch 74 or 75 will close a circuit to energize the solenoid 105. On the other hand, closing of either switch 74 or 75 will not complete the circuit for energizing the solenoid 105 so long as the switch 96 remains open. Untimely energization of the solenoid thus will be precluded. It will be understood that the circuit for energizing and causing operation of the solenoid may include, in addition to the main elements thereof shown in Fig. 7, any known electrical part or parts desired to assure the intended action by the solenoid irrespective of the brevity of the time either switch 74 or 75 remains closed.

For brevity, the articles which fail to pass the gauging test at the gauging station will hereinafter sometimes be referred to as "defective articles" and the articles that pass the test as "good articles."

The intermittent rotary movements of the turret T in a counter-clockwise direction, as viewed in Fig. 1, will bring each article that has been gauged to a reject station which is designated R. If the article is defective, as determined by the gauging thereof, reject mechanism which has been set in a manner presently explained will function to eject the defective article from its pocket in the turret. If the article has been determined to be good, a further rotary movement of the turret will bring it to a delivery station, designated D, at which suitably timed article removal means will act to discharge the good article into a delivery chute 106 by which each such article may be delivered onto a conveyor 107. The latter is shown in Fig. 1 as being a continuation of the conveyor 37 by which the articles to be gauged are brought to the loading mechanism but obviously it may be a separate, suitably positioned conveyor.

Figure 6:
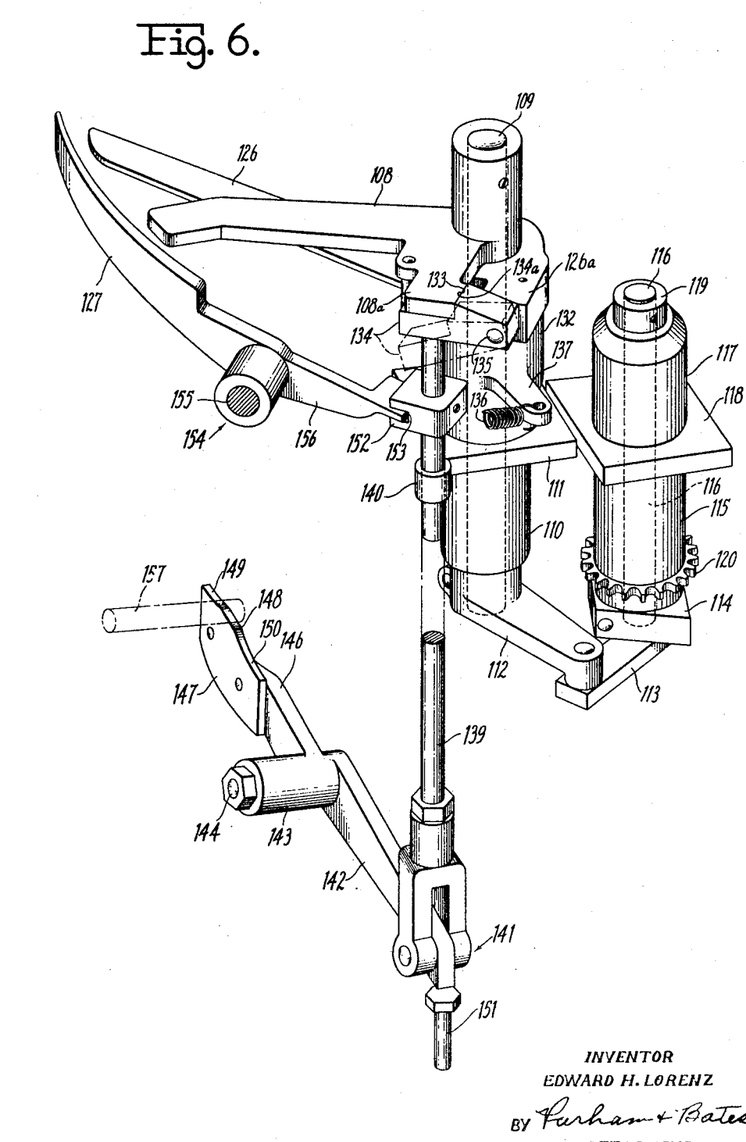
Fig. 6 is a relatively enlarged schematic view, showing in perspective the cooperative elements of the defective-article-ejecting mechanism and certain associate parts of the machine.

Mechanism for ejecting good articles from the turret pockets into the chute 106 may comprise a horizontally swingable wiper arm 108 which is mounted to swing from the rear part of a pocket at the delivery station, as from the position indicated by the dot-and-dash lines in Fig. 1, outwardly through that pocket to the full line position in the same view, thereby pushing into the chute 106 any article 33 that is in that pocket when it reaches the delivery station. As best seen in Fig. 6, the arm 108 is the upper arm of a bell crank lever having a vertical shaft portion 109 journaled in a vertical bearing 110 carried by any suitable stationary support, indicated at 111. The lower arm of this bell crank lever, indicated at 112, is operatively connected by a link 113 with a crank 114 on the lower end of a vertical sleeve 115. The latter is mounted on a vertical shaft 116 which may be journaled in a bearing 117 on a stationary support 118. The shaft may be retained against downward displacement from its bearing by a collar 119 which is fastened on the upper portion of the shaft and may rest upon the bearing 117. The sleeve 115 carries a sprocket 120. A chain 121, Fig. 4, may be trained about the sprocket 120, about a relatively large sprocket 122 on the hereinbefore mentioned sprocket shaft 49 of the loading mechanism and about a sprocket 123 on a vertical shaft 124. The latter also carries a sprocket 125 about which the hereinbefore mentioned chain 92 is trained. The chain 92 is driven from the continuously rotated shaft 13, 13a so that the chain 121 likewise will be continuously driven and will impart continuous rotary motion to the sprocket 120, the sleeve 115 and the crank 114. The bell crank lever which includes the arm 108 for ejecting good articles from the turret at the delivery station will be oscillated repeatedly. The operation is such that the arm 108 will be moved from its dot-and-dash line position of Fig. 1 to its full line position in the same view each time a pocket P of the turret is at rest at the delivery station. Driving of the sprocket 122 effects driving of the chain 45 of the loading mechanism by which articles are loaded seriatim into successively presented turret pockets at the loading station.

The means for ejecting defective articles from the turret at the station R comprises a wiper arm 126, Figs. 1 and 6, mounted to swing horizontally from the dot-and-dash line position, Fig. 1, outwardly through the pocket P at the reject station to the full line position of Fig. 1, thereby ejecting from that pocket a defective article provided that a vertically movable, normally raised gate 127 has first been lowered. This is accomplished in a manner presently to be pointed out. The defective article may then fall into a receptacle 128 which may be a chute or might be a conveyor or any other suitable receiver for defective articles. In the example shown, the chute 128 is part of a waste receptacle 129, Fig. 3, which is suspended beneath the turret, as from a horizontal supporting plate 130, in position to receive any broken articles. The horizontal supporting plate 130 may be supported, at least in part, on vertical posts 131, Figs. 4 and 5, uprising from the horizontal plate 7, Fig. 5.

The oscillatory arm 126 normally remains in the dot-and-dash line position of Fig. 1. It will be operated to eject a defective article from the turret when conditions prerequisite for its operation have been established. These comprise the establishment of a driving connection between the arm 126 and a means for oscillating it. In the example shown, the means for oscillating the arm 126 may be the same as that employed to oscillate the arm 108 by which the good articles are ejected from the turret. To this end, the arm 126 is formed as an arm of a bell crank lever having a hub 132, Fig. 6, loosely mounted on the shaft 109 directly beneath the arm 108. The latter is provided with a laterally projecting position 108a having a straight vertical surface 133 at its rearward side. A vertically swingable latch block 134 is pivotally mounted on a horizontal pivot element 135 carried by a laterally enlarged portion 126a of the arm 126 so that an upward projection 134a of this latch block will abut the surface 133 on the part 108a of the arm 108 when the latch block is in its raised position, as shown by the full lines in Fig. 6. The latch tends to fall by gravity to its dot-and-dash line position in which it will be entirely cleared by the laterally extending portion 108a of the arm 108 as the latter swings from its dot-and-dash line position of Fig. 1 to its full line position of the same view. A coil spring 136 connects a laterally extending arm 137 on the bell crank hub 132 with a fixed anchorage, indicated at 138 in Fig. 1, and is under sufficient tension to return the arm 126 to the dot-and-dash line position of Fig. 1 after each article-ejecting, outward stroke thereof.

A vertically movable, vertical lifter rod 139 is located directly beneath the pivoted latch 134, being guided in part by a fixed guide ring 140, carried by the supporting member 111. The lower end of this lifter rod 139 is operatively connected at 141 with a lever arm 142 having a hub 143 fulcrumed on a horizonal shaft 144. The latter may be carried by a bracket 145 on the horizontal supporting plate 7. See Fig. 4. A second lever arm, indicated at 146, extends from the hub 143 in a direction generally opposite to the lever arm 142 and carries a cam plate 147. The upper surface of the cam plate 147 comprises an intermediate, relatively high portion 148 and lower portions 149 and 150, respectively, at the opposite ends of the high portion. When the lifter rod 139 is in its lower, inactive position, it may rest upon a fixed stop 151, which may be provided on the horizontal supporting member 7.

The lifter rod carries a block 152, Fig. 6, which has a horizontal slot 153 in a side thereof. The hereinbefore mentioned gate 127, which in its raised position bars egress of an article from a turret pocket at the reject station R, is pivoted at 154 on a fixed horizontal shaft 155, Fig. 1, and has an opposite extending tail piece, or lever arm 156, Figs. 1 and 6, extending into the slot 153. Thus, when the lifter rod 139 is raised to lift the latch 134 from the position shown by dot-and-dash lines in Fig. 6 to the full line position of the same view, the gate 127 will be swung downwardly to permit ejection of a defective article from the turret pocket at the reject station R.

The rotary carrier 23 on the intermittently rotated main shaft 1 carries a series of regularly spaced, longitudinally movable, radial pins 157, Figs. 3, 4 and 5. These correspond in number and relative arrangement with the pockets P of the turret, there being a pin for each of such pockets. As shown, the pins protrude from the ends of, and are slidable in, radial openings 158 in a depending flange or skirt portion 159 of the carrier 23. Yieldable friction devices, shown as compressed coil springs 160 in pockets 161 in the carrier 23, bear against the pins 157 so as to retain each against accidental or unintended longitudinal movement in its slide opening from any position to which it has been moved. Stop elements 162 are provided on the pins 157 adjacent to the opposite ends thereof to limit longitudinal movements of the pins in either direction in their slide openings.

When the pins 157 are outwardly projected, as shown for the right hand pin in Fig. 3 and for all but the upper pin and the pin next to the left thereof in Fig. 4, the pins are inactive. A stationary cam 163, Figs. 3 and 4, is located beneath the carrier 23 in position to contact the pins in turn, as the carrier 23 turns counter-clockwise as viewed in Fig. 4, so as to bias each inwardly retracted pin outward to its inactive position. This occurs before the turret pocket represented by that pin arrives at the gauging station. When that pocket is at the gauging station, its pin 157 is in position, as shown by the right hand pin in Fig. 4, to be biased radially inward by a pusher arm 164 of a bell crank lever 165. The bell crank lever 165 includes an arm 166 connected by a link 167 with the plunger 168 of the hereinbefore mentioned solenoid 105. If the article in the pocket at the gauging station is defective, as determined by the gauging thereof, the solenoid will be energized as hereinbefore has been explained. The consequent retraction of the solenoid plunger 168 from the position shown in Fig. 4 will effect operation of the bell crank 165 so that its pusher arm 164 will push the pin 157 in contact therewith radially inward. The inwardly retracted position of a pin 157 is shown for the left hand pin in Fig. 3, for the upper pin in Fig. 4 and also for the pin that is shown diagrammatically in Fig. 6.

When the turret pocket containing the defective article arrives at the reject station, its inwardly retracted pin will have been moved onto the cam 147, Figs. 3, 4 and 6, to the high portion 148 of that cam, thereby operating the lever 146, 143, 142 and its connected lifter rod 139. The latch 134, Fig. 6, will be swung upwardly to position to latch the wiper arm 126 to the wiper arm 108. Lifting of the rod 139 also will cause lowering of the gate 127, as previously has been explained. In consequence of these operations, the next article-ejecting stroke of the wiper arm 108 will be attended by a like stroke of the arm 126 and the defective article will be ejected from its pocket at the reject station.

A coil spring 169, Figs. 4 and 5, connects the arm 166 of the pin-setting bell crank lever 165 with a fixed anchorage, such as a pin 170 on the supporting plate 7, and serves to return the solenoid plunger 168 to its projected position when the solenoid has been de-energized and, of course, to return the bell crank lever 165 to its inactive position, as shown in Fig. 4.

A guard member, 171, may be provided adjacent to the turret T between the article gauging station and the reject station to prevent accidental or unintended outward displacement of an article from a pocket of the turret during travel of the pocket between these stations.

Each intermittent rotary motion of the turret T will present a pocket P at the loading station, another such pocket at the gauging station, still another pocket at the reject station and a further pocket at the delivery station. An article 33 to be gauged will be pushed into the pocket at the loading station by the operation of the loading mechanism. An article in the pocket at the gauging station will be gauged by the gauging mechanism in the manner described. If this article is defective, the solenoid 105 will be energized and will cause actuation of the control means by which the pin 157 for that pocket is moved to its radially inward, active position. During the travel of that pin required for the travel of its pocket to the reject station, it will actuate the mechanism by which the wiper arm 126 is latched to the wiper arm 108 and the gate 127 is lowered. The defective article will thereupon be ejected from its pocket at the reject station. If a good article has been brought to the delivery station by the pocket there, it also will be ejected from the turret but to a different receiver. Thereafter, the temporarily lowered gate 127 will return to its raised, active position, the wiper arm 126 will be unlatched from the arm 108, and the inwardly retracted pin 157 will be returned to its outwardly projected, inactive position. A continuous series of articles may be introduced into the pockets of the turret, gauged, and discharged from the machine, the defective articles being delivered at one place and the good articles at another. The machine is fully automatic and will operate with rapidity and accuracy.

I do not wish to be limited to the details of the illustrative machine shown in the drawings and hereinbefore particularly described as many changes therein and modifications thereof now will be obvious to those skilled in the art.

I claim:

1. An article gauging machine comprising a horizontally disposed rotary turret having a series of open pockets in its periphery each adapted to accommodate an upright glass jar or similar hollow glass article having an externally approximately circular portion to be gauged, each pocket being open at its top and at its side at the periphery of the turret and having a substantially flat bottom surface on which such an article may stand and be supported in an upright position, means to rotate said turret intermittently to present each of said pockets in turn at a plurality of stations successively, these stations being located at relatively fixed angularly spaced places around the periphery of said turret, means located at one of said stations to gauge the approximately circular portion of such an article in each of successively presented pockets when that pocket is at that particular station to determine if said portion meets applicable requirements as to its diameter and surface contour, and normally inactive means set by said gauging means only if the gauged article fails to meet said requirements so as automatically to eject that article laterally outward from its pocket when that pocket arrives at another of said stations.

2. An article gauging machine as recited in claim 1 wherein each of said pockets has a pair of opposed article-positioning rollers projecting into the upper part thereof from opposite sides thereof at a predetermined radial distance from the entrance to the pocket at the periphery of the turret and a second pair of cooperative opposed article-positioning rollers projecting into said pocket from opposite sides thereof at a lower level and at a greater radial distance from the entrance to the pocket.

3. An article gauging machine as recited in claim 1 wherein the pockets have means to position the articles therein and the means to gauge an article in a pocket at the gauging station comprises a gauging element occupying a relatively fixed position such that it will contact the approximately circular portion of said article at one point on its periphery, a cooperative gauging element mounted to contact said portion of the article at a point diametrically opposite the first gauging element and to move relatively to the latter toward and away from the axis of said portion of the article, means to rotate the article to turn said approximately circular portion thereof about said axis while in contact with said gauging elements, and means responsive to a movement of said movable gauging element relative to said first gauging element to a predetermined extent from a point located at a predetermined distance from the latter, while said elements are in gauging contact with said article to set said normally inactive means subsequently to eject the article, from its pocket as aforesaid.

4. An article gauging machine as recited in claim 1, and, in combination therewith, a safety device operatively associated with the normally inactive article-ejecting means to prevent setting of the latter by said gauging means while the turret is rotating and to permit said setting when the turret is at rest with the pockets thereof at said stations.

5. The combination with a horizontally disposed rotary turret provided with a series of article-accommodating pockets, each open at its top and at its side at the periphery of the turret and each having a substantially flat bottom surface on which a glass jar or similar hollow glass article may stand upright and be supported, and means to rotate said turret to present each of said pockets in turn at an article loading station, an article inspection station, a defective article ejection station and a good article ejection station, said stations being located at angularly spaced, relatively fixed positions around the periphery of the turret of article testing means acting automatically to test each article in a pocket at said inspection station to determine whether the article is defective or good, an article-ejecting member movable from an inactive position adjacent to the good article ejection station to eject, on each working stroke thereof, a good article from a turret pocket at the good article ejection station, means to operate said article-ejecting member to cause a working stroke thereof each time a pocket of said turret is at the good article ejection station, another article-ejecting member movable from an inactive position to eject, on a working stroke thereof, a defective article from a turret pocket at the defective article ejection station, latching means operable to operatively connect the second article-ejecting member directly to the operating means for the first article-ejecting member so that the same operating means will then be effective to cause working strokes of both article-ejecting members and to disconnect it from said operating means, and means controlled by said article-testing means to operate said latching means.

6. The combination with a horizontally disposed rotary turret provided with a series of article-accommodating pockets, each open at the periphery of the turret, and means to rotate said turret to present each of said pockets in turn at an article loading station, an article inspection station, a defective article ejection station and a good article ejection station, of article-testing means acting automatically to test each article in a pocket at said inspection station to determine whether the article is defective or good, an article-ejecting member movable from an inactive position adjacent to the good article ejection station to eject, on each working stroke thereof, a good article from a turret pocket at the good article ejection station, means to operate said article-ejecting member to cause a working stroke thereof each time a pocket of said turret is at the good article ejection station, another article-ejecting member movable from an inactive position to eject, on a working stroke thereof, a defective article from a turret pocket at the defective article ejection station, latching means operable to operatively connect the second article-ejecting member with the operating means for the first article-ejecting member and to disconnect it from said operating means, means controlled by said article-testing means to operate said latching means, a movable gate to prevent egress of an article from a turret pocket at the defective article ejection station when the gate is closed, and means operatively connecting said gate with said means to operate said latching means.

7. The combination with a horizontally disposed rotary turret provided with a series of article-accommodating pockets, each open at the periphery of the turret, and means to rotate said turret to present each of said pockets in turn at an article loading station, an article inspection station, a defective article ejection station and a good article ejection station, of article-testing means acting automatically to test each article in a pocket at said inspection station to determine whether the article is defective or good, an article-ejecting member movable from an inactive position adjacent to the good article ejection station to eject, on each working stroke thereof, a good article from a turret pocket at the good article ejection station, means to operate said article-ejecting member to cause a working stroke thereof each time a pocket of said turret is at the good article ejection station, another article-ejecting member movable from an inactive position to eject, on a working stroke thereof, a defective article from a turret pocket at the defective article ejection station, latching means operable to operatively connect the second article-ejecting member with the operating means for the first article-ejecting member and to disconnect it from said operating means, and means controlled by said article-testing means to operate the latching means, said latching means comprising cooperative latch elements respectively carried by said article ejecting members, one of said latch elements being movable into and out of engagement with the other, said means to operate said latching means comprising a rod movable in one direction to cause said movable latch element to engage the other and in the opposite direction to cause disengagement thereof, cam-actuated means to move said rod, a series of individually radially movable pins mounted to rotate with said turret, there being a pin for each of said pockets and each pin being adapted when at the limit of its radial movement in one direction to actuate said cam-actuated means on rotation of the turret and to clear said cam-actuated means when at the limit of its radial movement in the opposite direction, a solenoid, means operable by the article-testing means to energize the solenoid when the article in a pocket at the inspection station is defective, means operable by said solenoid, when it is energized, to move the pin for that pocket radially to its first named position, and means to return said pin radially to its second position after its pocket has left said defective article ejection station.

EDWARD H. LORENZ.

REFERENCES CITED

The following references are of record in the file of this patent:

UNITED STATES PATENTS

| Number | Name | Date |
| --- | --- | --- |
| 1,023,074 | Gaynor | Apr. 9, 1912 |
| 1,581,200 | Guenther | Apr. 20, 1926 |
| 1,825,751 | Meyer | Oct. 6, 1931 |
| 1,981,641 | Benoit | Nov. 20, 1934 |
| 2,270,613 | Young | Jan. 20, 1942 |
| 2,307,957 | Reynolds | Jan. 12, 1943 |
| 2,318,856 | Hoffman | May 11, 1943 |
| 2,338,868 | Owens | Jan. 11, 1944 |
| 2,353,758 | Peck | July 18, 1944 |
| 2,355,092 | Meister | Aug. 8, 1944 |
| 2,407,062 | Darrah | Sept. 3, 1946 |
| 2,421,036 | Meister | Mar. 27, 1947 |